Figure 1:
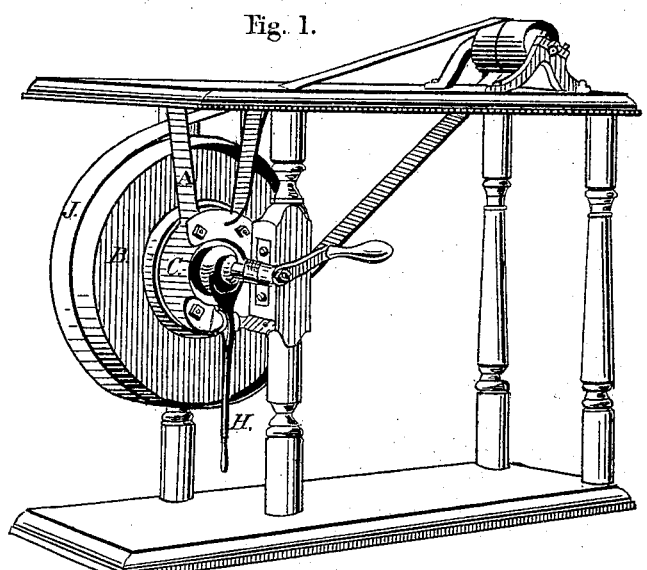

T. BELL & J. F. HILLERICH.
Idlers for Belt-Gearings.

No. 141,417. Patented August 5, 1873.

WITNESSES.
Jas. O. Griffin
Will. B. Boies.

INVENTOR.
Thomas Bell
John F. Hillerich, by
J. G. Hewitt attorney

UNITED STATES PATENT OFFICE.

THOMAS BELL AND JOHN F. HILLERICH, OF LOUISVILLE, KENTUCKY

IMPROVEMENT IN IDLERS FOR BELT-GEARING.

Specification forming part of Letters Patent No. 141,417, dated August 5, 1873; application filed July 3, 1873.

*To all whom it may concern:*

Be it known that we, THOMAS BELL and JOHN F. HILLERICH, of the city of Louisville, county of Jefferson and State of Kentucky, have invented a certain new and useful Improvement in Idlers, as a substitute for the loose pulley generally used in ordinary belt-gearing, of which the following is a specification:

This our invention consists more especially in a pulley of suitable construction, working on a ring or flange projecting from the side of a stationary hanger, secured firmly to the frame or girder of the building in such a manner as to be entirely independent of the shaft or driving-pulley, of which it is the mate, in order to prevent the constant wear and tear of the shaft and eye of the pulley, to which both are constantly liable, especially when the pulley is made to work loose on the shaft, as now generally used in ordinary belt-gearing. The stationary hanger of this pulley may be made of either wood or iron, in any suitable form, with a flat ring of the required size secured to the side, so that the driving-shaft will be perfectly in the center when so fastened. This last-named ring is turned off true, and has another ring or flange secured to the face, slightly smaller in diameter, which projects from the hanger sufficient to make the depth of the pulley-hub that works on it. This flange is also turned off true, with a rabbet cut out of the corner next to the hanger, so as to form a groove at the hanger to receive the flange in the eye of the pulley to prevent it from slipping off. The outside or face part of the pulley is made, in all respects, similar to those now in common use, except that the eye or opening through the center is made large, so that when bored out perfectly smooth it will fit neatly over the flange projecting from the side of the hanger, with the small flange in the eye working in the groove to keep it in its place. The opening of this pulley, where it works over the flange, is nearly closed, on the side next to the stationary pulley, by means of a flange-plate secured to the hub of the pulley, as shown in the drawing. This flange is also provided with a large hub in the center, to answer as the outer ring of the friction-cone, with the opening extending in so as to leave only a small thickness of the flange on the inside, in order to rest against the hub of the tight pulley. The opening in the hub of this last-named flange is bored out, with more or less taper from the outside, to suit the friction required to drive large or small pulleys. The driving-shaft that works the pulley is provided with a sliding sleeve, working loosely on a stationary key set in the shaft. One end of this sleeve has a large head turned off neatly to correspond with the size and taper of the opening in the flange-hub, to answer as the friction-cone to operate the pulley; while the other end extends back beyond the hanger, with a groove cut in it to receive the ends of the forked lever by which it is operated.

The friction-cone above referred to may be made either of wood, metal, paper, or any other kind of material, in any form most suitable; but instead of using friction exclusively to give motion to the pulley, any other kind of clutch, or its equivalent, may be used, when required.

The object of this our invention is to provide a substitute for the old style of idlers or loose pulleys, such as are generally used in ordinary belt-gearing, especially where the pulley has been made to work loose on the shaft, which is very objectionable from the fact that the eye is constantly liable to wear and injure the shaft; but by the use of this our invention no such objection can occur, from the fact that the pulley never touches the shaft, but remains at rest, except when necessary to change the belt, for which purpose it is put in motion gradually by means of pressure on the friction-cone, and, as soon as the belt is run on, it is stopped until wanted again, when all that is necessary is to put it in motion, as before, in order to transfer the belt to the driving-pulley, and thereby start the machine, when it is again stopped until wanted; consequently there can be no wearing of the parts, but there is a great saving in power, cost of belts, and other expenses.

Although the above pulley, when made as herein described, is intended to be used as an idler or loose pulley, it may also be used as a driving-pulley, when necessary, and may be made to work on a plain journal or sleeve secured to the side of the hanger, so as to be independent of the shaft, without any groove, and but slightly larger than the shaft, but must be long enough to permit the pulley to slide on it, so as to admit of its being pressed up against the rim of the stationary pulley, which is beveled on the inside to receive the edge of the rim of the idler, which is also beveled to correspond, so as to enter the rim of the driving-pulley about one inch, in order to answer as a substitute for the friction-cone hereinbefore described. The hub of the pulley on the side next to the hanger is made sufficiently long to give room on the end for a groove to receive the ends of the forked lever by which it is operated.

Figure 2:
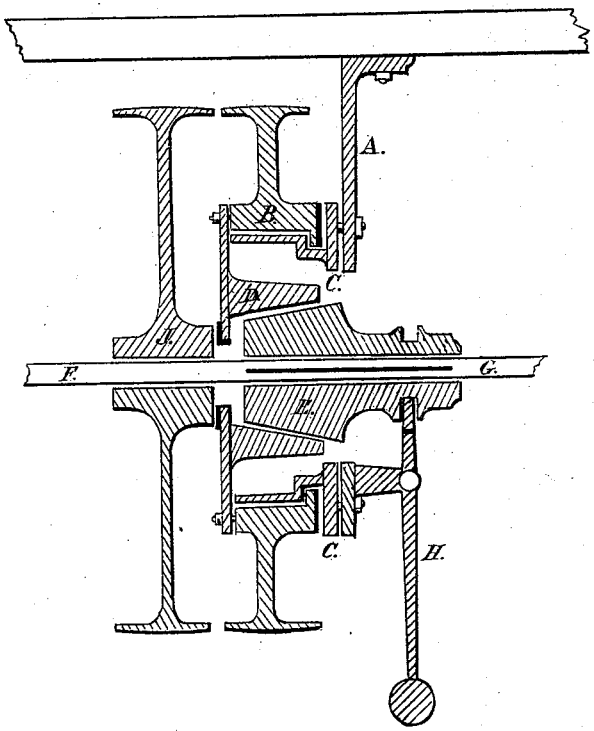

Figure 1 is a perspective view of the device, showing its general construction. Fig. 2 is a sectional view of the pulley, showing the interior arrangement of the several parts.

In the drawings, A is the hanger, which is generally made of iron, and in form as shown in the drawings; but may be made of wood, in any suitable form; or, if necessary, a column of the house may be used. B is the pulley or idler. C C is the stationary ring and flange on which the pulley works. D is the center hub or friction-ring, all of which is made as shown in the drawings, and is bored with a taper from the outside to correspond with the cone that works in it. E is the friction-cone, the end of which is made to fit neatly in the ring, but not so as to enter quite the full depth; while the other end extends back on the shaft beyond the hanger, with a groove to receive the ends of the forked lever by which it is operated. This cone is kept from turning on the shaft by a stationary key set therein.

The friction-cone may be made of any required size or taper to produce sufficient friction to suit the size of the pulley used, and may be made of any kind of material.

F is the shaft. G is the stationary key therein. H is the lever by which the friction-tion-cone is operated. This lever may have a weight attached to the lower end in order to hold it in position to prevent wearing of the parts. J is the stationary or driving-pulley.

Having thus fully described the drawings, we do not claim anything as new in the stationary pulley or shaft on which it is placed; but

What we do claim as our invention, and desire to secure by Letters Patent, is—

The pulley B and hanger A, with its ring and flange C C, and friction-ring D, as above described, when the pulley is made to work on a ring or flange on the side of the hanger, so that both shall be independent of the shaft, in combination with the friction-cone E and lever H, by which it is operated, when arranged, constructed, and operated substantially as and for the purpose hereinbefore set forth.

THOMAS BELL.
JOHN F. HILLERICH.

Witnesses:
WILL. B. BOIES,
JAS. O. GRIFFIN.